United States Patent
Eiraku

(10) Patent No.: US 7,562,527 B2
(45) Date of Patent: Jul. 21, 2009

(54) INTERNAL COMBUSTION ENGINE WITH A SUPERCHARGER

(75) Inventor: Akira Eiraku, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 149 days.

(21) Appl. No.: 11/596,883

(22) PCT Filed: Oct. 7, 2005

(86) PCT No.: PCT/JP2005/018897

§ 371 (c)(1),
(2), (4) Date: Nov. 17, 2006

(87) PCT Pub. No.: WO2006/038730

PCT Pub. Date: Apr. 13, 2006

(65) Prior Publication Data
US 2008/0066723 A1    Mar. 20, 2008

(30) Foreign Application Priority Data
Oct. 8, 2004    (JP)    .............................. 2004-296551

(51) Int. Cl.
*F02D 23/00*    (2006.01)
*F02B 37/18*    (2006.01)

(52) U.S. Cl. ..................................................... 60/602

(58) Field of Classification Search ........... 60/600–603, 60/605.1, 611; 123/564; 417/293
See application file for complete search history.

(56) References Cited

U.S. PATENT DOCUMENTS

| | | | |
|---|---|---|---|
| RE17,689 E * | 6/1930 | Hibbard | 417/293 |
| 3,195,805 A * | 7/1965 | Cholvin et al. | 60/602 |
| 4,248,047 A | 2/1981 | Sumi | 60/602 |
| 4,284,263 A * | 8/1981 | Newcomb | 251/129.06 |
| 4,304,097 A * | 12/1981 | Kondo et al. | 60/602 |
| 4,311,008 A * | 1/1982 | Yamada | 60/602 |
| 4,585,207 A * | 4/1986 | Shelton | 251/62 |
| 4,658,587 A * | 4/1987 | Ecomard | 60/602 |
| 5,791,145 A * | 8/1998 | Freen | 60/603 |
| 5,950,432 A * | 9/1999 | Zimmer et al. | 60/605.1 |

(Continued)

FOREIGN PATENT DOCUMENTS

JP    A 55-69725    5/1980

(Continued)

*Primary Examiner*—Thai Ba Trieu
(74) *Attorney, Agent, or Firm*—Oliff & Berridge PLC

(57) ABSTRACT

In an internal combustion engine with a supercharger, there is provided a technique capable of quickly raising supercharging pressure. In the internal combustion engine with a supercharger which includes a communication passage 6 that connects between those portions of an exhaust passage 3 which are upstream and downstream of an exhaust gas turbine 4c of the supercharger 4, and a waste gate valve 7 that is arranged in said communication passage 6 so as to open from an upstream side of said communication passage 6 to a downstream side thereof, provision is made for a drive unit that applies a fixed force directed from the downstream side to the upstream side of said communication passage 6 to said waste gate valve 7. By applying the fixed force to the waste gate valve 7, said waste gate valve 7 is not opened until a differential pressure between the upstream and downstream sides of the waste gate valve 7 becomes larger than the fixed force, so the supercharging pressure rises smoothly.

13 Claims, 7 Drawing Sheets

U.S. PATENT DOCUMENTS

| | | | |
|---|---|---|---|
| 6,279,551 B1 * | 8/2001 | Iwano et al. | 123/564 |
| 6,755,166 B2 * | 6/2004 | Chang et al. | 74/838 |
| 7,024,300 B2 * | 4/2006 | Ellmer | 60/602 |
| 2004/0004405 A1 * | 1/2004 | Ausderau | 310/12 |

FOREIGN PATENT DOCUMENTS

| | | |
|---|---|---|
| JP | A 63-41622 | 2/1988 |
| JP | U 63-82033 | 5/1988 |
| JP | A 1-110832 | 4/1989 |
| JP | A 3-294623 | 12/1991 |
| JP | A 5-141258 | 6/1993 |
| JP | A 8-504011 | 4/1996 |
| JP | A 10-103069 | 4/1998 |
| JP | A 2002-195046 | 7/2002 |

* cited by examiner

INTERNAL COMBUSTION ENGINE WITH A SUPERCHARGER

TECHNICAL FIELD

The present invention relates to an internal combustion engine with a supercharger.

BACKGROUND ART

In an internal combustion engine with a supercharger, in order to prevent an excessive rise in engine output power, there are provided a communication passage for connecting between the upstream and downstream sides of an exhaust gas turbine of a supercharger, and a waste gate valve for opening and closing the communication passage, wherein when supercharging pressure rises, the waste gate valve is opened to decrease the flow rate of exhaust gas passing through the exhaust gas turbine so as to prevent the supercharging pressure from rising excessively.

There has been known a technique in which provision is made for a main urging means for urging a waste gate valve in a direction downstream of an exhaust gas in accordance with rising of the supercharging pressure, and an urging force correction means for urging the waste gate valve in a direction to cancel a differential pressure between the upstream and downstream sides of the waste gate valve in accordance with the magnitude of the differential pressure, wherein surging is suppressed by counterbalancing the influence of the differential pressure between the upstream and downstream sides of the waste gate valve (see, for example, a first patent document (Japanese utility model application laid-open No. S63-82033), a second patent document (Japanese patent application laid-open No. 2002-195046), a third patent document (Japanese patent application laid-open No. H5-141258), a fourth patent document (Japanese patent application laid-open No. H3-294623) and a fifth patent document (Japanese patent application laid-open No. H1-110832).

However, a spring for urging the waste gate valve is set in such a manner that the waste gate valve is fully opened at a maximum supercharging pressure. In such a setting, when the differential pressure between the upstream and downstream sides of the waste gate valve becomes equal to or higher than a certain pressure which is even lower than the maximum supercharging pressure, the spring is gradually displaced in accordance with the increasing differential pressure, whereby the waste gate valve is caused to gradually open. As the waste gate valve is gradually opened in this manner, the amount of exhaust gas for rotating the turbine is excessively decreased, thereby making the rising of the supercharging pressure dull or gradual. As a result, the engine torque does not increase quickly, thus deteriorating driveability.

DISCLOSURE OF THE INVENTION

The present invention has been made in view of the above-mentioned problems, and has for its object to provide a technique which is capable of quickly raising supercharging pressure in an internal combustion engine with a supercharger.

In order to achieve the above-mentioned object, an internal combustion engine with a supercharger according to the present invention includes:

a communication passage that connects between those portions of an exhaust passage which are upstream and downstream of an exhaust gas turbine of the supercharger; and a waste gate valve that is arranged in said communication passage so as to open from an upstream side of said communication passage to a downstream side thereof; and is characterized by comprising a drive unit that applies a fixed force directed from the downstream side to the upstream side of said communication passage to said waste gate valve.

The major feature of the present invention resides in that by applying the fixed force to the waste gate valve, said waste gate valve is not opened until a differential pressure between the upstream and downstream sides of the waste gate valve becomes larger than the fixed force.

That is, the waste gate valve is closed with the fixed force by means of the drive unit, so said waste gate valve is not opened until the fixed force is applied to the waste gate valve in a valve opening direction. Accordingly, it is possible to make the entire amount of exhaust gas flow through the exhaust gas turbine, so the supercharging pressure can be raised quickly. In addition, when the differential pressure equal to or larger than the fixed force is applied to the waste gate valve, said waste gate valve is opened to permit the exhaust gas to flow into the communication passage, as a result of which the amount of the exhaust gas flowing through the exhaust gas turbine decreases, thus suppressing further rising of the supercharging pressure.

Here, note that the "fixed force" may be a force that is applied to the waste gate valve when the supercharging pressure becomes maximum and is a predetermined/target/setting force.

In the present invention, further provision is made for an intake air throttle valve that is arranged in the intake passage of the internal combustion engine for adjusting the flow rate of intake air in accordance with the degree of accelerator opening.

When the accelerator opening is less than or equal to a degree of accelerator opening at which the degree of opening of said intake air throttle valve becomes a predetermined degree of opening, the fixed force directed from the downstream side to the upstream side of said communication passage is applied to said waste gate valve, whereas when the accelerator opening is larger than the degree of accelerator opening at which the degree of opening of said intake air throttle valve becomes the predetermined degree of opening, a force applied to said waste gate valve in a direction from the downstream side to the upstream side of said communication passage is increased in accordance with the increasing degree of accelerator opening.

Here, note that in the operating state where a large output is not required to the internal combustion engine, a high supercharging pressure is not required, either. However, in a conventional internal combustion engine with a supercharger, the waste gate valve can not be opened in the state of a low supercharging pressure, so the output of the internal combustion engine is adjusted by changing the degree of opening of the intake air throttle valve until the supercharging pressure is raised to a pressure value at which the waste gate valve can be opened. If, however, the output is adjusted in this manner by changing the degree of opening of the intake air throttle valve, a mechanical loss according to the rotation of the exhaust gas turbine, a heat loss in the supercharger and an intercooler, a pumping loss due to the rising of the exhaust pressure and so on become large, resulting in reduction in the engine efficiency.

In addition, even if said waste gate valve can be opened at an arbitrary supercharging pressure by making the waste gate valve operated electrically, it is difficult to smoothly perform output adjustment in accordance with the operation of an accelerator pedal by a driver.

In this respect, according to the present invention, the waste gate valve is closed, with respect to an output increase request, by a relatively small fixed or constant force until the degree of opening of the intake air throttle valve is adjusted to the degree of accelerator opening that becomes the predetermined opening. At this time, the larger the output increase request, i.e., the larger the degree of accelerator opening, the larger the degree of opening of the intake air throttle valve and the degree of opening of the waste gate valve become, and in case where there is a further increasing output increase request, the larger the output increase request, the larger the force applied to the waste gate valve is made. In this case, the degree of opening of the waste gate valve is gradually decreased, in accordance with which the output of the internal combustion engine is increased.

Thus, in the operating state that does not need a large output, by adjusting the force that closes the waste gate valve to a relatively small constant value, the waste gate valve can be opened even with a low supercharging pressure. As a result, the degree of opening of the intake air throttle valve can be made greater, the engine efficiency can be improved.

In addition, in case where the intake air throttle valve has been adjusted to the predetermined degree of opening, output adjustment can be carried out by gradually changing the force to close the waste gate valve. As a result, smooth output adjustment can be done.

In view of the above, in order to achieve the above-mentioned object, an internal combustion engine with a supercharger according to the present invention includes:

a communication passage that connects between those portions of an exhaust passage which are upstream and downstream of an exhaust gas turbine of the supercharger;

a waste gate valve that is arranged in said communication passage so as to open from an upstream side of said communication passage to a downstream side thereof; and an intake air throttle valve that is arranged in an intake passage of the internal combustion engine for adjusting the flow rate of intake air in accordance with the degree of accelerator opening; and is characterized by further comprising a drive unit that applies a force directed from the downstream side to the upstream side of said communication passage to said waste gate valve.

It may be characterized in that when the accelerator opening is larger than a degree of accelerator opening at which the degree of opening of said intake air throttle valve becomes a predetermined degree of opening, said drive unit increases the force applied to said waste gate valve in accordance with the increasing degree of accelerator opening.

Further, said drive unit may change the force applied to said waste gate valve in accordance with the number of revolutions per minute of the engine.

In addition, in the present invention, the fixed force that is applied from the drive unit to said waste gate valve can be decided in such a manner that said waste gate valve is not fully opened until said intake air throttle valve has been fully opened. With such an arrangement, the intake air throttle valve can be fully opened in a quick manner, the engine efficiency can be improved.

In the present invention, the force applied from said drive unit to said waste gate valve can be decided as a value with which the supercharging pressure under a full load of the internal combustion engine does not exceed a permissible value.

Thus, by deciding the force applied from the drive unit to the waste gate valve so that the supercharging pressure under the full load of the internal combustion engine does not exceed the permissible value, the waste gate valve is opened before the supercharging pressure exceeds the permissible value so that the exhaust gas comes to flow into the communication passage. As a result, it is possible to suppress the supercharging pressure from exceeding the permissible value.

As described in the foregoing, in the internal combustion engine with a supercharger according to the present invention, the supercharging pressure can be raised or increased quickly by suppressing the waste gate valve from being opened before the supercharging pressure rises to a satisfactory extent.

BEST MODE FOR CARRYING OUT THE INVENTION

Hereinafter, preferred embodiments of according to the present invention will be described while referring to the accompanying drawings.

Embodiment 1

Figure 1:
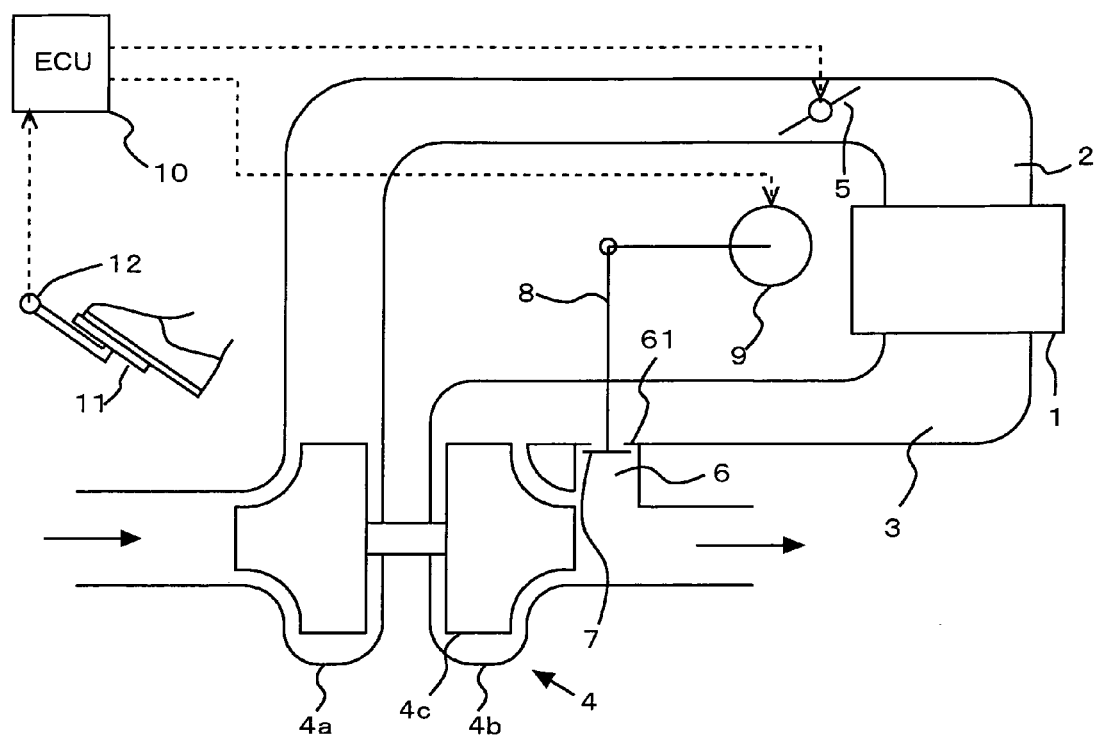
FIG. 1 is a view showing the schematic construction of an internal combustion engine to which an internal combustion engine with a supercharger according to a first and a second embodiment of the present invention are applied, together with an intake and an exhaust system thereof and a supercharger.

FIG. 1 is a view that shows the schematic construction of an internal combustion engine to which an internal combustion engine with a supercharger according to this embodiment of the present invention is applied, together with an intake and an exhaust system thereof and a supercharger. An internal combustion engine 1 illustrated in FIG. 1 is a water-cooled four-cycle diesel engine.

An intake pipe 2 and an exhaust pipe 3 are connected with the internal combustion engine 1. A compressor housing 4a of a turbocharger 4, which is operated by the energy of an exhaust gas as a drive source, is arranged on the intake pipe 2.

Also, an intake air throttle valve 5, which adjusts the flow rate of intake air passing through the intake pipe 2, is arranged on the intake pipe 2 at a downstream side of the compressor housing 4a. The intake air throttle valve 5 is opened and closed by an electric actuator.

On the other hand, a turbine housing 4b of the turbocharger 4 is arranged on the exhaust pipe 3. In the turbine housing 4b, an exhaust gas turbine 4c, being driven to rotate by the energy of the exhaust gas, is arranged.

In addition, there is arranged a communication passage 6 that connects between those portions of the exhaust pipe 3 upstream and downstream of the turbine housing 4b. A valve seat 61, which serves to narrow the sectional area of the communication passage 6, is arranged in this communication passage 6. In addition, a waste gate valve 7, which serves to adjust the flow rate of the exhaust gas passing through said communication passage 6, is arranged in the communication passage 6 in such a manner as to be contactable with the valve seat 61.

The waste gate valve 7 is connected with an electric motor 9 through a link mechanism 8. Also, the waste gate valve 7 can move in parallel to a direction in which the exhaust gas passing through the communication passage 6 flows. When the waste gate valve 7 is caused to move to its opening side, it is moved in a direction from an upstream side to a downstream side of the flow of the exhaust gas in the communication passage 6, whereas when the waste gate valve 7 is caused to move to its closing side, it is moved from the downstream side to the upstream side of the flow of the exhaust gas in the communication passage 6. That is, when the downstream side of the valve seat 61 contacts the upstream side of the waste gate valve 7, the flow of the exhaust gas in the communication passage 6 is interrupted. Here, note that the waste gate valve 7 may take any other shape as long as a differential pressure acts in a direction to open the waste gate valve 7 when the pressure in the communication passage 6 upstream of the waste gate valve 7 is higher than the pressure downstream thereof.

An ECU 10 in the form of an electronic control unit for controlling the internal combustion engine 1 is provided in conjunction with the internal combustion engine 1 as constructed in the above-described manner. This ECU 10 serves to control the operating state of the internal combustion engine 1 in accordance with the operating condition of the internal combustion engine 1 and driver's requirements.

In addition, connected to the ECU 10 through electrical wiring, are an accelerator opening sensor 12 that can output an electric signal corresponding to an amount of depression at which the driver has depressed an accelerator pedal 11, and detect an engine load state, a crank position sensor 13 that detects the number of revolutions per minute of the engine, and other various sensors, so that the output signals of the above-mentioned variety of kinds of sensors are input to the ECU 10.

On the other hand, the intake air throttle valve 5 and the electric motor 9 are connected to the ECU 10 through electrical wiring, so that the intake air throttle valve 5 and the electric motor 9 can be controlled by the ECU 10. For example, the ECU 10 controls the degree of opening of the intake air throttle valve 5 based on the output signal of the accelerator opening sensor 12.

When the ECU 10 supplies electric power to the electric motor 9, the electric motor 9 is driven to rotate in a direction to close the waste gate valve 7. Here, note that by supplying a fixed voltage and a fixed current to the electric motor 9, the torque generated by the electric motor 9 can be kept constant. As a result, a force to close the waste gate valve 7 (hereinafter referred to as a closing force) can be made constant. The torque generated from the electric motor can be increased in accordance with the increasing current flowing into the electric motor 9 while a fixed voltage is impressed to the electric motor 9, whereby the closing force of the waste gate valve 7 can be increased. Here, note that the electric motor 9 in this embodiment corresponds to a drive unit in the present invention.

However, in a conventional internal combustion engine with a supercharger, a waste gate valve is closed by an urging force of a spring.

Figure 2:
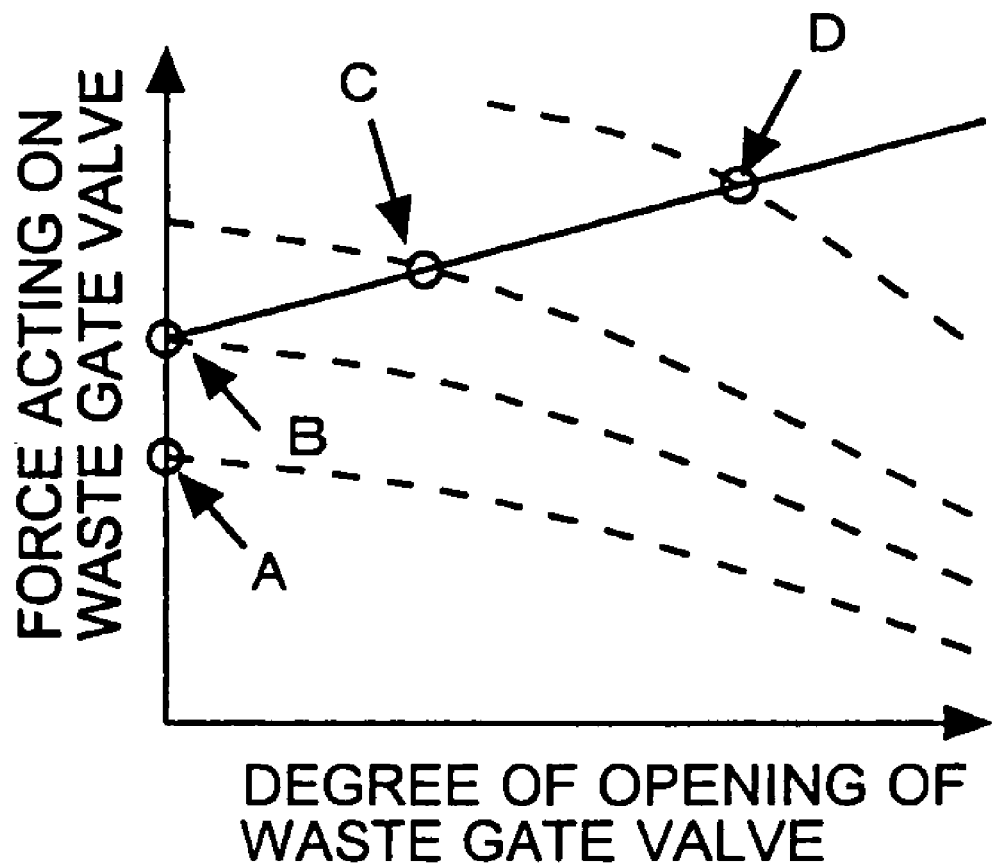
FIG. 2 is a view showing the relation between the degree of opening of a waste gate valve and the magnitude of a force acting on the waste gate valve in a conventional internal combustion engine with a supercharger.

Here, FIG. 2 is a view that shows the relation between the degree of opening of a waste gate valve and the magnitude of a force acting on the waste gate valve in a conventional internal combustion engine with a supercharger. The axis of abscissa represents the degree of opening of the waste gate valve, and the axis of ordinate represents the magnitude of the force acting on the waste gate valve.

A broken line in FIG. 2 indicates the magnitude of a differential pressure between the upstream and downstream sides of the waste gate valve, i.e., the magnitude of a force to open the waste gate valve. The larger the degree of opening of the intake air throttle valve, the greater the differential pressure between the upstream and downstream sides of the waste gate valve becomes. That is, the broken line moves upward in FIG. 2 in accordance with the increasing degree of opening of the intake air throttle valve. Also, a solid line in FIG. 2 indicates a force to close the waste gate valve, i.e., the urging force of the spring. Here, note that the force to open the waste gate valve is a force directed from the upstream side to the downstream side of the waste gate valve, and the force to close the waste gate valve is a force directed from the downstream side to the upstream side of the waste gate valve.

The degree of opening of the waste gate valve is represented by the intersection of the force to close the waste gate valve and the force to open the waste gate valve (e.g., points A through D in FIG. 2).

When the degree of opening of the intake air throttle valve is small and when the force to open the waste gate valve is smaller than the force to close the waste gate valve (point A in FIG. 2), the waste gate valve remains closed.

As the degree of opening of the intake air throttle valve increases, the force to open the waste gate valve increases. When the intake air throttle opening becomes larger than that at the time when the force to open the waste gate valve and the force to close the waste gate valve become equal to each other (point B in FIG. 2), the force to open the waste gate valve becomes larger than the force to close the waste gate valve, so the waste gate valve is opened (point C in FIG. 2). Further, as the degree of opening of the intake air throttle valve increases, the force to open the waste gate valve becomes larger, so the degree of opening of the waste gate valve increases accordingly. The spring constant of the spring is set in such a manner that when the intake air throttle valve becomes fully opened (point D in FIG. 2), the waste gate valve is fully opened, too.

In this manner, in the conventional internal combustion engine with a supercharger, the waste gate valve is urged by the spring. Accordingly, the force to open the waste gate valve becomes larger than the force to close the waste gate valve before the intake air throttle valve is fully opened, so the waste gate valve begins to open. As a result, the exhaust gas flows into the communication passage 6, and hence the amount of exhaust gas passing through the turbine housing 4b accordingly decreases, thereby making rising of the supercharging pressure dull or gradual.

Figure 3:
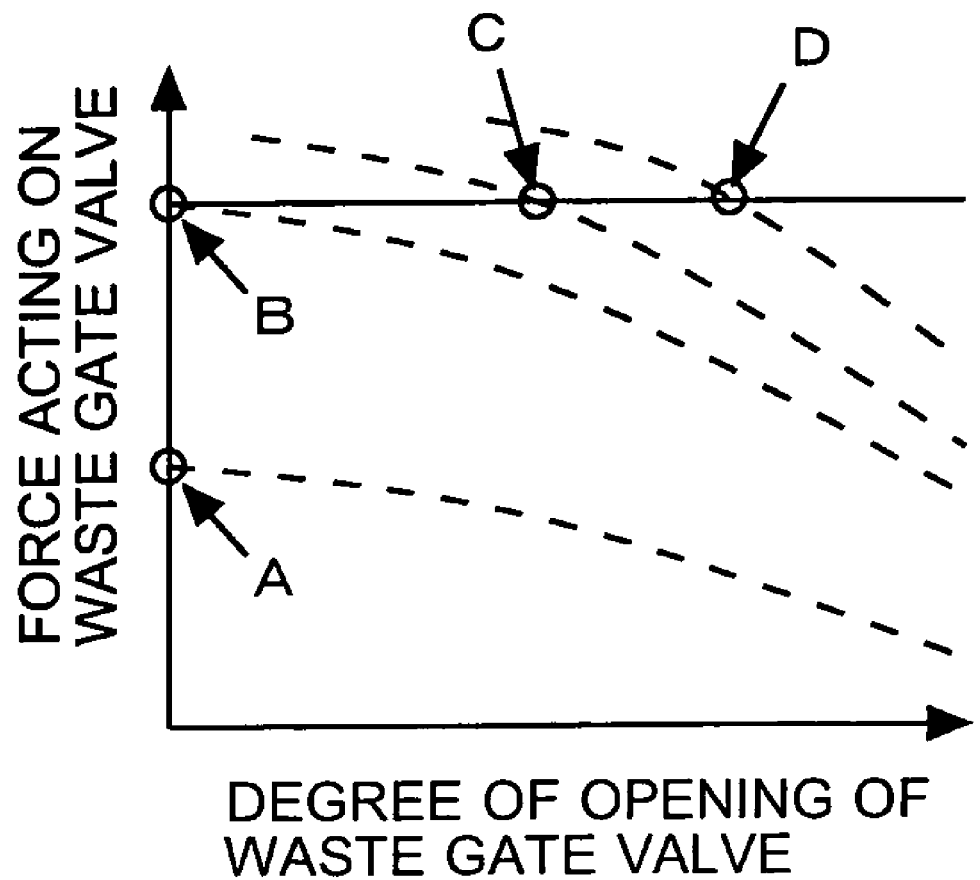
FIG. 3 is a view showing the relation between the degree of opening of a waste gate valve and the magnitude of a force acting on the waste gate valve in the internal combustion engine with a supercharger according to the first embodiment of the present invention.

On the other hand, FIG. 3 is a view that shows the relation between the degree of opening of the waste gate valve and the magnitude of the force acting on the waste gate valve in the internal combustion engine with a supercharger according to this embodiment. The axis of abscissa represents the degree of opening of the waste gate valve 7, and the axis of ordinate represents the magnitude of the force acting on the waste gate valve 7. Here, note that points A through D in FIG. 3 are used with the same meaning as in FIG. 2.

In this embodiment, by supplying a fixed voltage and a fixed current to the electric motor 9 at all times, the electric motor 9 generates a constant or fixed torque. Accordingly, the force to close the waste gate valve 7 always becomes constant. The current and voltage supplied to the electric motor 9 are set in such a manner that the force to close the waste gate valve 7 (i.e., the force applied to the waste gate valve 7 by the electric motor 9) and the force to open the waste gate valve 7 when the intake air throttle valve 5 is fully opened (i.e., the force applied to the waste gate valve 7 by the differential pressure between the upstream and downstream sides of the waste gate valve 7) become equal to each other. Thus, by making the force to close the waste gate valve 7 constant, the degree of opening of the intake air throttle valve 5 when the waste gate valve 7 opens becomes more larger. Accordingly, the waste gate valve 7 will not open until the supercharging pressure becomes more higher, and hence dull or gradual rising of the supercharging pressure as in the conventional case can be suppressed. As a result, the supercharging pressure can be raised in a quick manner.

Figure 4:
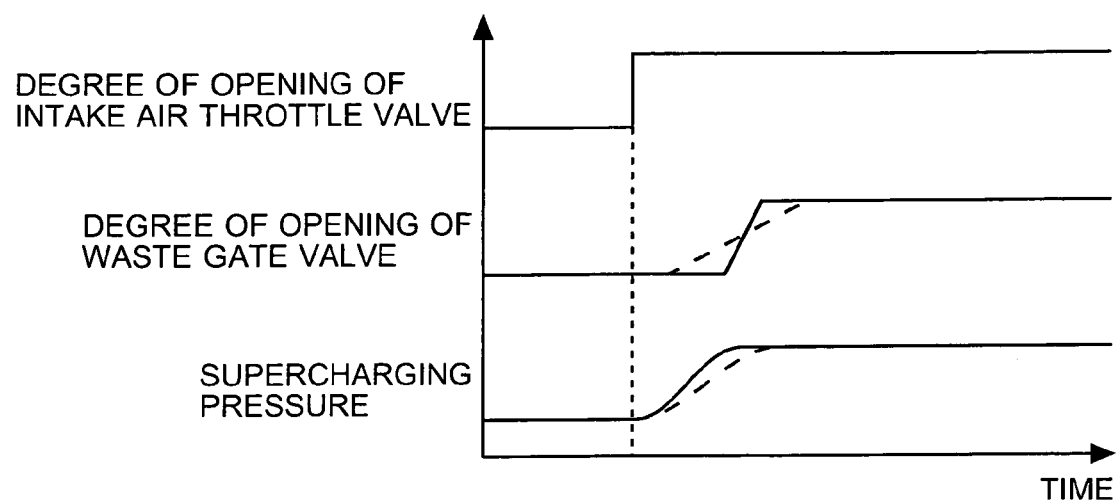
FIG. 4 is a timing chart showing the changes of an intake air throttle opening (upper row), the degree of opening of the waste gate valve (middle row), and supercharging pressure (lower row).

FIG. 4 is a timing chart that shows the changes of the intake air throttle opening (upper row), the degree of opening of the waste gate valve (middle row), and the supercharging pressure (lower row). A solid line represents the internal combustion engine with a supercharger according to this embodiment, and a broken line represents the conventional internal combustion engine with a supercharger.

Thus, in the internal combustion engine with a supercharger according to this embodiment, the time at which the waste gate valve begins to open after the intake air throttle valve is opened is later, as compared with the conventional one. Thus, the supercharging pressure rises quickly.

Although in this embodiment, the closing force of the waste gate valve 7 is made constant by supplying the fixed or constant current to the electric motor 9 while impressing the fixed or constant voltage thereto, such control on the electric motor 9 may not be needed if provision is made for a construction that serves to make the closing force of the waste gate valve 7 constant. For example, the pressure in a diaphragm that opens and closes the waste gate valve 7 may be kept constant.

Here, though it is considered that the waste gate valve is motorized or operated electrically so that the waste gate valve is opened and closed in accordance with the pressure of the exhaust gas, accurate control is difficult due to the thermal expansion of a sensor that detects the pressure of the exhaust gas, a sensor that detects the degree of opening of the waste gate valve, etc. This is because the waste gate valve exerts a great influence on the output of the internal combustion engine even with a slight difference in the degree of opening thereof, as compared with the intake air throttle valve.

As described in the foregoing, in this embodiment, by making the force to close the waste gate valve 7 constant, the degree of opening of the intake air throttle valve 5 when the waste gate valve 7 opens can be made larger, whereby the supercharging pressure can be raised quickly, thus making it possible to improve driveability. In addition, it is less subject to the influence of the heat of the exhaust gas, and hence the accuracy of control on the supercharging pressure can be improved.

Embodiment 2

In this embodiment, the supercharging pressure is controlled by controlling the degree of opening of the intake air throttle valve 5 and the degree of opening of the waste gate valve 7. The hardware is common with that of the first embodiment, and hence an explanation thereof is omitted.

Figure 5:
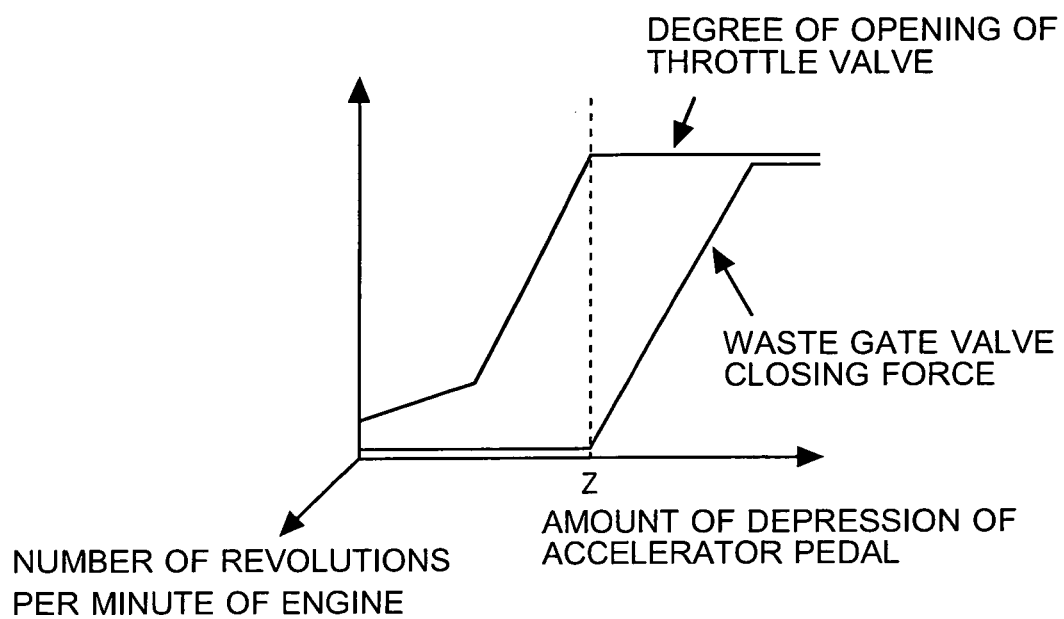
FIG. 5 is a view showing the relation among the amount of depression of an accelerator pedal, an intake air throttle opening, and a waste gate valve closing force according to the second embodiment.

Here, FIG. 5 is a view that shows the relation among the amount of depression of an accelerator pedal 11 (accelerator opening), the opening of an intake air throttle valve 5, and the closing force of a waste gate valve 7 according to this embodiment. The relation among the amount of depression of the accelerator pedal 11, the degree of opening of the intake air throttle valve 5, and the closing force of the waste gate valve 7 varies according to the number of revolutions per minute of the internal combustion engine 1.

Figure 6:
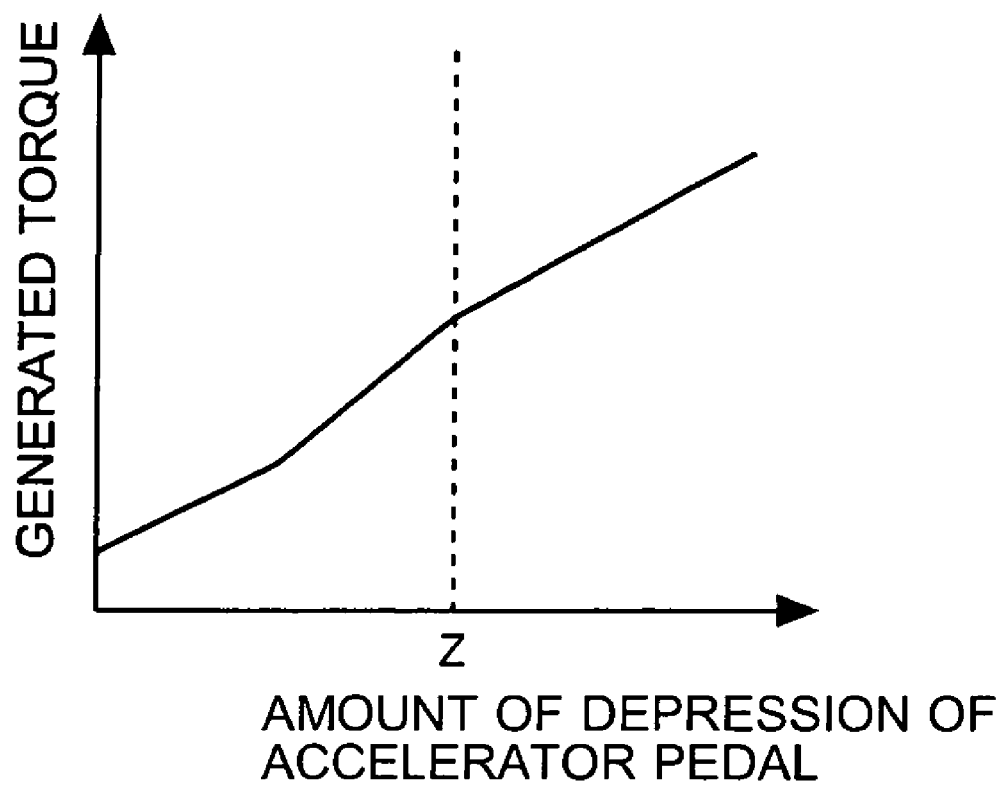
FIG. 6 is a view showing the relation between the amount of depression of the accelerator pedal and the torque generated by the internal combustion engine according to the second embodiment.

In addition, FIG. 6 is a view that shows the relation between the amount of depression of the accelerator pedal 11 and the torque generated by the internal combustion engine 11 according to this embodiment.

Figure 7:
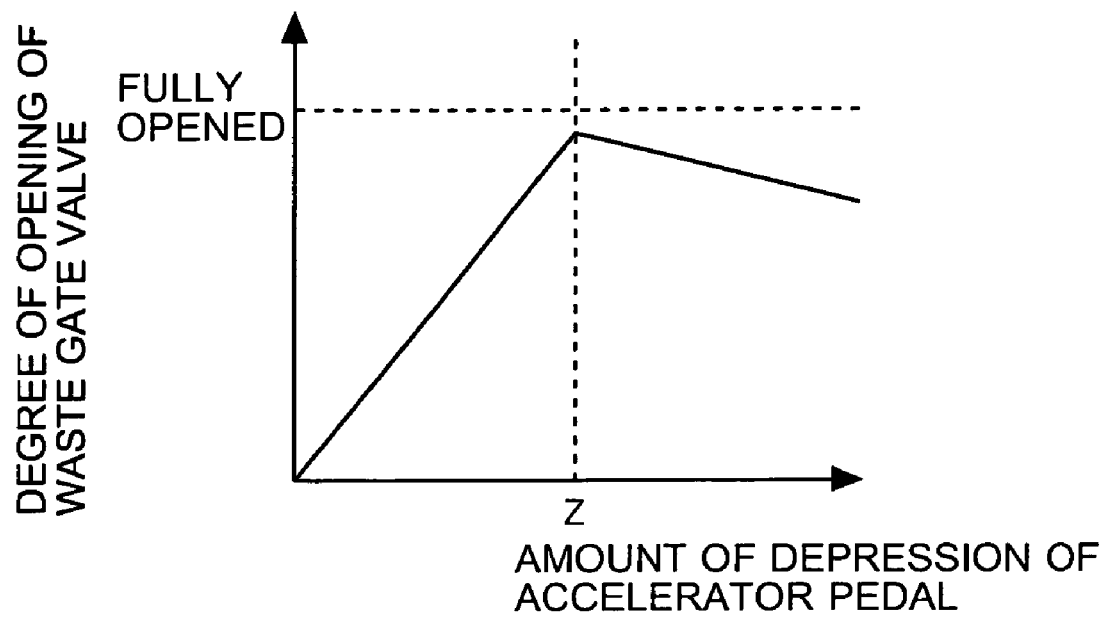
FIG. 7 is a view showing the relation between the amount of depression of the accelerator pedal and the degree of opening of the waste gate valve according to the second embodiment.

Further, FIG. 7 is a view that shows the relation between the amount of depression of the accelerator pedal 11 and the degree of opening of the waste gate valve 7 according to this embodiment.

Here, note that the amounts of depression Z of the accelerator pedal 11 in FIGS. 5, 6 and 7 are all the same values.

In this embodiment, when the amount of depression of the accelerator pedal 11 is relatively small (i.e., less than or equal to the amount of depression Z of the accelerator pedal 11), a fixed voltage is impressed to the electric motor 9 and a fixed current is supplied to the electric motor 9 so that the force to close the waste gate valve 7 becomes constant at a relatively small value until the degree of opening of the intake air throttle valve 5 is fully opened. At this time, the fixed voltage and the fixed current is supplied to the electric motor 9 so that the degree of opening of the waste gate valve 7 increases in accordance with an increasing differential pressure across the waste gate valve 7. In addition, the force to close the waste gate valve 7, i.e., the voltage and current supplied to the electric motor 9 are set in such a manner that the waste gate valve 7 from being fully opened even when the intake air throttle valve 5 becomes fully opened. This force to close the waste gate valve 7 is obtained beforehand by experiments or the like as a relation between the number of revolutions per minute of the internal combustion engine 1 and the amount of depression of the accelerator pedal 11, and mapped and stored in the ECU 10.

Here, note that the waste gate valve 7, when fully opened, does not move immediately even if a force, which can move the waste gate valve 7 in a valve closing direction, acts on the waste gate valve 7. In this respect, by setting the force to close the waste gate valve 7 so as to prevent the waste gate valve 7 from being fully opened even when the intake air throttle valve 5 becomes fully opened, it is possible to improve the response performance of the waste gate valve 7.

Also, when the accelerator pedal 11 is depressed further after the intake air throttle valve 5 becomes fully opened (larger than the amount of depression Z of the accelerator pedal 11), the force to close the waste gate valve 7 is increased in accordance with the amount of depression of the accelerator pedal 11 until the intake air throttle valve 5 is fully opened. At this time, the force to close the waste gate valve 7 is set so that the degree of opening of the waste gate valve 7 is decreased in accordance with the increasing amount of depression of the accelerator pedal 11. This force to close the waste gate valve 7 is obtained beforehand by experiments or the like as a relation between the number of revolutions per minute of the internal combustion engine 1 and the amount of depression of the accelerator pedal 11, and mapped and stored in the ECU 10.

Thus, since the supercharging pressure need not be raised when the amount of depression of the accelerator pedal 11 is less than or equal to the amount of depression Z of the accelerator pedal 11, the degree of opening of the waste gate valve 7 is made to increase as the amount of depression of the accelerator pedal 11 increases. As a result, when the output of the internal combustion engine 1 is the same, the degree of opening of the intake air throttle valve 5 can be made much greater than that in the conventional internal combustion engine with a supercharger, and hence the supercharging pressure can be lowered. Accordingly, a mechanical loss due to the rotation of the turbine can be lowered, and in addition, a heat loss in the turbocharger 4 and the intercooler as well as a pumping loss due to the rising of the exhaust pressure can be lowered. In addition, the output control of the internal combustion engine can be carried out more smoothly in comparison with the case where the degree of opening of the waste gate valve 7 is controlled in a feedback manner.

On the other hand, when the amount of depression of the accelerator pedal 11 is larger than the amount of depression Z of the accelerator pedal 11, the intake air throttle valve 5 is fully opened, so the pumping loss is small. By changing the closing force of the waste gate valve 7, the degree of opening of the waste gate valve 7 is changed, and the supercharging pressure is accordingly adjusted, so it becomes less subject to the influence of the heat of the exhaust gas. Thus, the supercharging pressure can be controlled accurately, and besides driveability can be improved.

The invention claimed is:

1. An internal combustion engine with a supercharger comprising:
   a communication passage that connects between those portions of an exhaust passage which are upstream and downstream of an exhaust gas turbine of the supercharger;
   a waste gate valve that is arranged in said communication passage so as to open from an upstream side of said communication passage to a downstream side thereof; and
   a drive unit that applies a constant force directed from the downstream side to the upstream side of said communication passage to said waste gate valve;
   wherein the constant force applied from said drive unit to said waste gate valve is a value with which a supercharging pressure under a full load of the internal combustion engine does not exceed a predetermined permissible value.

2. An internal combustion engine with a supercharger comprising:
   a communication passage that connects between those portions of an exhaust passage which are upstream and downstream of an exhaust gas turbine of the supercharger;
   a waste gate valve that is arranged in said communication passage so as to open from an upstream side of said communication passage to a downstream side thereof;
   an intake air throttle valve that is arranged in an intake passage of the internal combustion engine for adjusting the flow rate of intake air in accordance with the degree of accelerator opening; and
   a drive unit that applies a force directed from the downstream side to the upstream side of said communication passage to said waste gate valve;
   wherein when the accelerator opening is larger than a degree of accelerator opening at which the degree of opening of said intake air throttle valve becomes a predetermined degree of opening, the force applied to said waste gate valve is a varied force and is increased in accordance with the increasing degree of accelerator opening.

3. The internal combustion engine with a supercharger as set forth in claim 2, wherein said drive unit applies the varied force to said waste gate valve when the number of revolutions per minute of the engine becomes larger than the predetermined number.

4. The internal combustion engine with a supercharger as set forth in claim 3, wherein the force that is applied from said drive unit to said waste gate valve is set so that said waste gate valve is not fully opened until said intake air throttle valve has been fully opened.

5. The internal combustion engine with a supercharger as set forth in claim 3, wherein the force applied from said drive unit to said waste gate valve is a value with which a supercharging pressure under a full load of the internal combustion engine does not exceed a predetermined permissible value.

6. The internal combustion engine with a supercharger as set forth in claim 2, wherein the force that is applied from said drive unit to said waste gate valve is set so that said waste gate valve is not fully opened until said intake air throttle valve has been fully opened.

7. The internal combustion engine with a supercharger as set forth in claim 2, wherein the force applied from said drive unit to said waste gate valve is decided as a value with which a supercharging pressure under a full load of the internal combustion engine does not exceed a predetermined permissible value.

8. An internal combustion engine with a supercharger comprising:
   a communication passage that connects between those portions of an exhaust passage which are upstream and downstream of an exhaust gas turbine of the supercharger;
   a waste gate valve that is arranged in said communication passage so as to open from an upstream side of said communication passage to a downstream side thereof;
   a drive unit that applies a force directed from the downstream side to the upstream side of said communication passage to said waste gate valve; and
   an intake air throttle valve that is arranged in an intake passage of the internal combustion engine for adjusting the flow rate of intake air in accordance with the degree of accelerator opening;
   wherein when the accelerator opening is less than or equal to a degree of accelerator opening at which the degree of opening of said intake air throttle valve becomes a predetermined degree of opening, the force applied to said waste gate valve in a direction from the downstream side to the upstream side of said communication passage is a constant force, and when the accelerator opening is larger than the degree of accelerator opening at which the degree of opening of said intake air throttle valve becomes the predetermined degree of opening, the force applied to said waste gate valve in a direction from the downstream side to the upstream side of said communication passage is a varied force and is increased in accordance with the increasing degree of accelerator opening.

9. The internal combustion engine with a supercharger as set forth in claim 8, wherein said drive unit applies the varied force to said waste gate valve when the number of revolutions per minute of the engine becomes larger than the predetermined number.

10. The internal combustion engine with a supercharger as set forth in claim 9, wherein the constant force that is applied from said drive unit to said waste gate valve is set so that said waste gate valve is not fully opened until said intake air throttle valve has been fully opened.

11. The internal combustion engine with a supercharger as set forth in claim 9, wherein the force applied from said drive unit to said waste gate valve is decided as a value with which a supercharging pressure under a full load of the internal combustion engine does not exceed a predetermined permissible value.

12. The internal combustion engine with a supercharger as set forth in claim 8, wherein the constant force that is applied from said drive unit to said waste gate valve is set so that said waste gate valve is not fully opened until said intake air throttle valve has been fully opened.

13. The internal combustion engine with a supercharger as set forth in claim 8, wherein the force applied from said drive unit to said waste gate valve is a value with which a supercharging pressure under a full load of the internal combustion engine does not exceed a predetermined permissible value.

* * * * *